Patented Mar. 17, 1925.

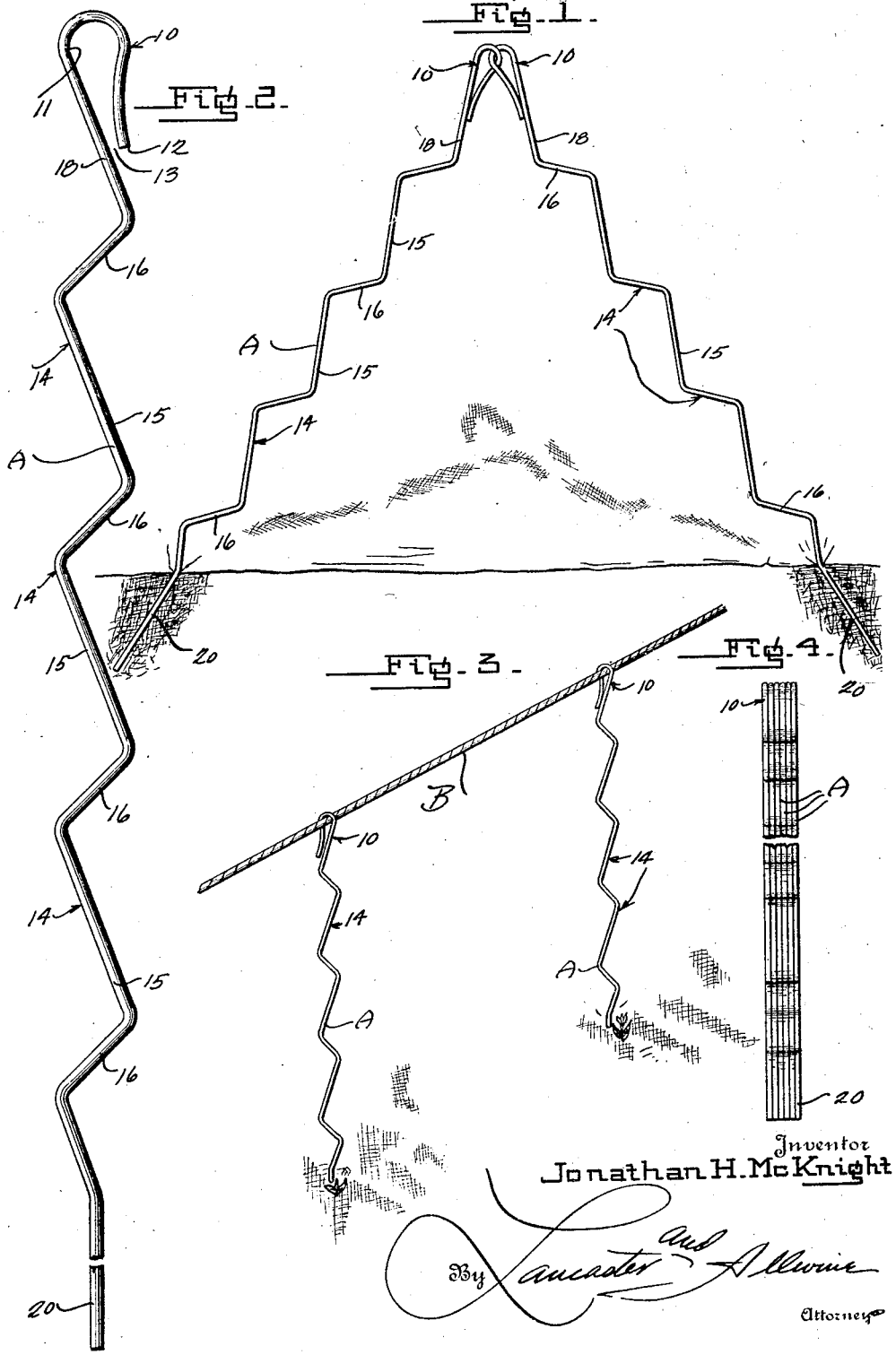

1,529,705

UNITED STATES PATENT OFFICE.

JONATHAN H. McKNIGHT, OF MILLPORT, ALABAMA.

TRELLIS FOR PLANTS.

Application filed June 12, 1922. Serial No. 567,729.

*To all whom it may concern:*

Be it known that I, JONATHAN H. MCKNIGHT, a citizen of the United States, residing at Millport, in the county of Lamar and State of Alabama, have invented certain new and useful Improvements in Trellis for Plants, of which the following is a specification.

This invention relates to a trellis for the support of plants.

The primary object of this invention is the provision of a relatively simple and compact trellis adapted for the support of climbing plants, such as bean stalks; being arranged in sections, so that the same may be disposed in a desired position to best enable the plants to climb the same.

A further object of the invention is the provision of a relatively simple and compact trellis, formed of a pair of sections which are so related that they may be adjusted for positioning at various angles with respect to each other, for supporting climbing plants thereon.

Other objects and advantages of this invention will be apparent during the course of the following detailed description.

In the accompanying drawing, forming a part of this specification, wherein similar reference characters designate corresponding parts throughout the several views, Figure 1 is a side elevation of the improved trellis showing the same in position in the ground for receiving climbing plants.

Figure 2 is a side elevation of one of the sections or members of the improved trellis.

Figure 3 is a perspective view showing the manner in which the sections of the trellis may be individually used in connection with a supporting cable.

Figure 4 is a side elevation, showing the manner in which the improved trellis sections may be compactly arranged for shipping purposes.

In the drawing, wherein for the purpose of illustration is shown the preferred form of trellis member, the letter A designates the improved trellis member, which is preferably formed of wire, and bent at its upper end to provide a loop portion 10 defining a socket 11; this loop portion 10 being open at the free end 12 of the member A to provide a passageway 13 into the socket 11 of the loop portion 10. The member A is provided with a plurality of crimps 14 symmetrically arranged longitudinally thereof, each of said crimps 14 including a relatively long straight portion 15, and a relatively shorter straight portion 16. The relatively long straight portions 15 of the crimps 14 are disposed in parallel relation, as are also the relatively shorter straight portions 16 arranged in parallel relation. It is preferred that the relatively straight portion 18 which forms the connecting part of the loop 10 be of straight line formation and which connects with a straight portion 16 of an adjacent crimp 14. The lower end of the member A is provided with the straight line portion 20, which is relatively longer than any other straight line portion upon the member A, and is provided for ground insertion. The portion 20 is axially disposed with respect to the run of the member A, so that it may be readily inserted in the ground, as is illustrated in Figure 1 of the drawings.

Referring to the trellis members A as they are illustrated in Figure 1 of the drawings, it can readily be seen that an arbor effect can be provided with a pair of the trellis members A, in which the portions of the crimps are so positioned as to best provide for the support of a climbing plant. In this position, the loops 10 of a pair of the members A may interengage, so that the two members may be disposed at a desired inclination. When so positioned, the portion 15 of each crimp 14 may be positioned substantially vertical, while the relatively shorter portions 16 may be positioned substantially horizontal, and which effect provides for the most effective climbing of a plant.

As is illustrated in Figure 3 of the drawing, the members A may be used individually, and in connection with a supporting cable B, so that the said members A may be positioned vertically as to the general run thereof.

The crimps 14, the loop 10, and in fact, all portions of the member A lie in a common plane, so that a plurality of the members A may be compactly assembled, as is illustrated in Figure 4 of the drawing, which is a most efficient arrangement for compact packing of the members A. It should be noted that these members A will be shipped in great amounts for sales and to nurseries, and it is highly desirable that they be of such conformation as to promote a compact shipping arrangement.

From the foregoing it can be seen that a trellis member has been provided which is of novel formation in that the same can be utilized with a similar trellis member, or may be individually used to provide a desired arrangement.

Various changes in the shape, size, and arrangement of parts may be made to the form of invention herein shown and described, without departing from the spirit of the invention or the scope of the claim.

I claim:

A trellis for climbing plants comprising a pair of separable sections each formed of a wire strand having one end portion formed into an open hook, the hooks being passed one through the other to connect the sections for extending downwardly in diverging relation, each of the wire strands being bent at points throughout its length to provide portions in angular relation to each other whereby certain of the portions extend substantially vertically and the others substantially horizontally when the sections are in predetermined diverging relation with their lower ends embedded in the ground for use.

JONATHAN H. McKNIGHT.